Wm Painter's Impd Lamp Burner.

2854 Assigned to Charles Painter.

Reissued

Feb 4 1868

Witnesses.

Thos F. Parker,

Geo E. Beck.

Wm & Charles Painter

By their Atty

A. D. Smith.

United States Patent Office.

WILLIAM PAINTER, OF BALTIMORE, AND CHARLES PAINTER, OF OWING'S MILLS, MARYLAND, ASSIGNEES OF WILLIAM PAINTER BY MESNE ASSIGNMENTS.

*Letters Patent No.* 39,102, *dated June* 30, 1863; *reissue No.* 2,854, *dated February* 4, 1868

IMPROVEMENT IN LAMP-BURNERS.

The Schedule referred to in these Letters Patent and making part of the same.

TO ALL WHOM IT MAY CONCERN:

Be it known that WILLIAM PAINTER, of Fallston, in the county of Harford, and State of Maryland, did invent a new and improved Burner for Lamps, of which the following is a full, clear, and exact description, reference being had to the accompanying drawings, in which—

Figure 1:
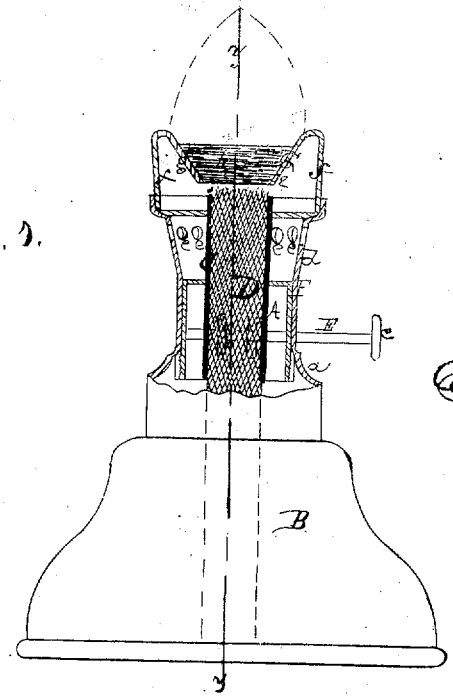
Figure 1 is a vertical section through the burner on line *x x*, fig. 2.
Figure 4:
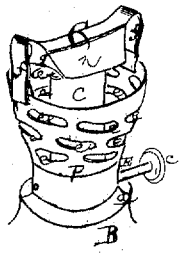
Figure 4 is a perspective view of this burner.
Figure 2:
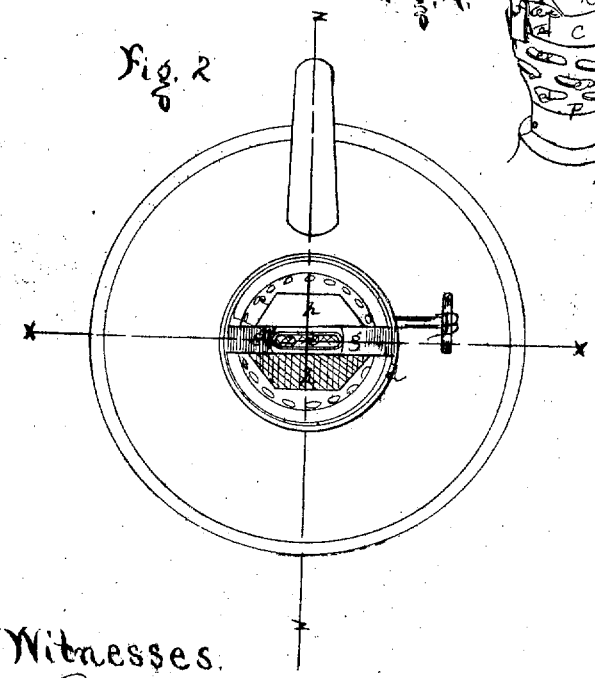
Figure 2 is a plan view of the burner.

This invention relates to that class of lamp-burners with which no chimney is used; and it consists in forming the flame-spreader or deflector with the ends and sides in one continuous plate, so fashioned and placed that the air to support combustion shall be permitted to ascend freely at the sides of the flame, and shall be prevented from ascending against the edges thereof.

We employ the term "continuous" in reference to the deflector or flame-spreader, in contradistinction to that class of burners which have portions of their deflectors opposite the edges of the flame, but with spaces between said portions at the edges, and those portions of said deflectors which are opposite the sides of the flame, and in which, therefore, the material of the deflector does not continuously or without break surround the wick and base of the flame. And for convenience we employ the word "plate" to designate said portions of the deflector which are opposite to the edges and sides of the wick and base of the flame, and which are formed from a single piece of metal, or with close joints, which in effect make the deflector continuous and unbroken, as set forth.

An unprotected flame, being supplied with oxygen by currents of air which rush in from every side, tends to assume a cylindrical form, and this form affords imperfect combustion, because the least amount of surface is thereby exposed to contact with the oxygen of the atmosphere. It is therefore necessary, in order to produce complete combustion, that the flame should be spread out in a sheet as thin as possible, and every atom of combustible gas brought in contact with the oxygen of the atmosphere.

When a draught-chimney is employed, an artificial current of air is thereby created, and this current can only gain access at the lower part of the burner, and is deflected against the base of the flame by the dome or cap which is always used. But when no chimney is employed, very different conditions obtain, and it is necessary to so form the spreader or deflector as to afford the freest access of currents of air to the sides, and to prevent, as far as possible, such access to the edges of the flame, to the end that the impinging currents at the sides of the flame and the natural levity of the burning gas may cause the flame to spread out laterally and form the thinnest possible sheet, without interference from ascending currents impinging against its edges.

That others may fully understand the construction and operation of this invention, we will fully explain it.

A is a metal tube, which is closed at its upper end, and provided with a screw at its lower end, to screw into a socket, *a*, on the top of the fountain or body, B, of the lamp. C is the wick-tube, which is secured vertically and centrally in tube A, and extends downward to a level with the bottom of the tube A, and projects some distance above the top of the same. The wick-tube is of the usual flat form, and the wick D is raised or lowered by serrated wheels, *b*, which are fitted on a shaft, E, as usual. The wheels *b* are within the tube A, the shaft E extending through the side of the same, and provided at its outer end with a small thumb-wheel, *c*.

By this arrangement it will be seen that no odor or vapor can escape from the fountain, B, through the holes in the wick-tube, in which the wheels *b b* are fitted, as said holes are tightly enclosed by the tube A. In the ordinary burners vapor and odor can escape in this way, and those burners which are designed to be used without chimneys are rendered very objectionable from this cause.

Figure 3:
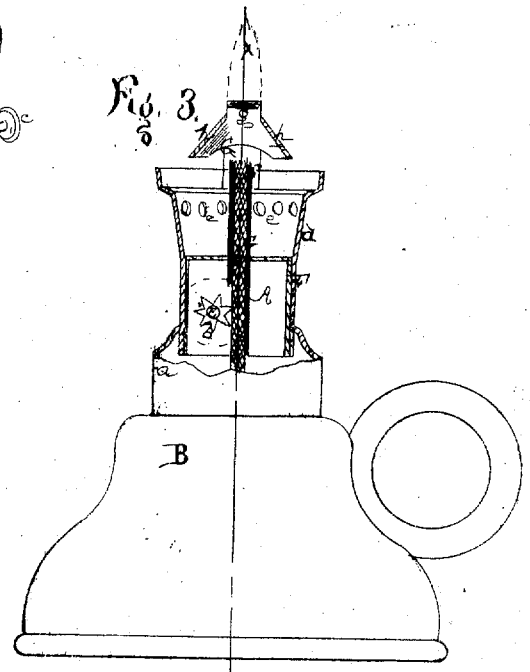
Figure 3 is a vertical section through the burner on line *z z*, fig. 2.

On the tube A there is fitted a sliding tube, F, which extends considerably above the tube A, and has its upper part, *d*, of flaring or inverted conical form, as shown clearly in figs. 1 and 3. This part *d* of the tube F is perforated, as shown at *e*, and to the upper end of said part *d* of the tube F there are attached, at two opposite points, the ends of a metal plate or deflector, G. The ends of the plate G have a vertical position, as shown at *f f'*, and are then bent downwards, as shown at *g g*, the parts *g* being much wider at their lower than at their upper ends, as shown in fig. 3, and at their lower ends being distant from each other about the width of the wick-tube C. The end parts *g g* are connected with each other by the side pieces *h h*, which are formed from the same continuous plate, and which conform to the positions of the inclined edges of the end pieces *g g*, so that while the parts *g g* are nearest each other at their lower ends, the side pieces *h h* are nearest each other at their upper edges.

From this description it will be seen that the parts *g g* and *h h* are in position the reverse of each other, and that they form an orifice below, which is about as long as the width of the wick-tube, but much wider than the thickness thereof, while the corresponding orifice above is much longer than the width of the tubes, and but little wider than the thickness of the same. This construction will be readily understood by reference to the drawings.

The end pieces *g g* cut off the ascending currents of air at the edges of the wick, and thereby permit the flame to widen and spread out laterally, while the side pieces *h h* permit the air to flow in freely, and deflect it against the sides of the flame, so as to secure perfect combustion. They also have an effect to render the flame steady, and to prevent it from being extinguished by a sudden upward or downward movement of the lamp.

The perforations *e e* admit the air freely to the space within the part *d* of the slide F, and said attachment may be raised or lowered in order to have a proper relative position with the flame by raising or lowering the tube F on the tube A, and the tube F may be entirely removed from A, to afford facilities for trimming the wick and cleaning the several parts of the burner.

The operation of my device is as follows: When the lamp is lighted the flame ascends through the spreader, the end pieces *g* protecting the edges of the flame from any ascending currents of air, and the sides of the flame being exposed to the pressure of currents rushing in below the spreader, the flame spreads out in a thin sheet, the edges extending over the end pieces *g*, as shown by red lines in fig. 1. The extent to which the flame spreads, and the consequent perfect combustion secured with this burner, are due to the fact that the end and side pieces form one continuous plate, with no opening through which to admit an upward current of air except opposite the sides of the flame.

Having described the construction and principles of operation of this invention, what we claim as new, is—

Having the side pieces *h h* and the ends *g.g* constructed and arranged in reverse inclined positions, in the manner herein shown and described.

The combination of the attachment above specified with the tubes F A, the latter being screwed into the fountain or body, B, of the lamp, and enclosing the wick-adjusting wheels *b*, as set forth.

Making the outer case F adjustable upon the tube A, so that the height of the cap G may be regulated, as and for the purpose set forth.

A deflector or flame-spreader, constructed so as to form a continuous plate around the flame, and fashioned so as to cut off the ascending currents of air from the edges of the flame and deflect them against the sides thereof, substantially as described, and for the purpose set forth.

W. PAINTER,
CHAS. PAINTER.

Witnesses:
LEWIS R. KEIZER,
ROBERT F. GROUND.